United States Patent
Dokken et al.

(10) Patent No.: US 12,071,207 B2
(45) Date of Patent: Aug. 27, 2024

(54) APPARATUS FOR DETERMINING AN OPTIMAL ROUTE OF A MARITIME SHIP

(71) Applicants: Offshore Navigation Limited, The Valley (AI); G.M.S. Global Maritime Services Ltd., London (GB)

(72) Inventors: Sverre Dokken, Monaco (MC); Kris Lemmens, Larnaca (CY); Jorgen Grindevoll, Sabaneta Antioquia (CO); Alexis Michael, Limassol (CY); Hans Lennart Cederberg, Norrköping (SE); Wengang Mao, Gothenburg (SE); Helong Wang, Gothenburg (SE); Waqas Ahmed Qazi, Rawalpindi (PK)

(73) Assignees: Offshore Navigation Limited (AI); G.M.S. Global Maritime Services Ltd (GB)

( * ) Notice: Subject to any disclaimer, the term of this patent is extended or adjusted under 35 U.S.C. 154(b) by 265 days.

(21) Appl. No.: 17/286,905

(22) PCT Filed: Oct. 14, 2019

(86) PCT No.: PCT/EP2019/077720
§ 371 (c)(1),
(2) Date: Apr. 20, 2021

(87) PCT Pub. No.: WO2020/083686
PCT Pub. Date: Apr. 30, 2020

(65) Prior Publication Data
US 2021/0348926 A1 Nov. 11, 2021

(30) Foreign Application Priority Data
Oct. 23, 2018 (EP) .................................... 18202074

(51) Int. Cl.
*B63B 79/15* (2020.01)
*B63B 79/20* (2020.01)

(52) U.S. Cl.
CPC .............. *B63B 79/20* (2020.01); *B63B 79/15* (2020.01)

(58) Field of Classification Search
CPC ........ B63B 79/15; B63B 79/20; G01C 21/203
See application file for complete search history.

(56) References Cited

U.S. PATENT DOCUMENTS

| 6,085,147 A | 7/2000 | Myers |
| 6,134,500 A | 10/2000 | Tang et al. |

(Continued)

FOREIGN PATENT DOCUMENTS

| CN | 107 798 185 A | 3/2018 |
| GB | 2 527 570 A | 12/2015 |

(Continued)

OTHER PUBLICATIONS

Pastusiak; "The Northern Sea Route as a Shipping Lane"; Chapter 7—Route Selection on the Northern Sea Route Under Continuously Changing Ice Conditions; pp. 155-180; 2016 (Year: 2016).*

(Continued)

*Primary Examiner* — Stephen Holwerda
(74) *Attorney, Agent, or Firm* — Holland & Hart LLP

(57) ABSTRACT

An apparatus for determining an optimal route of a maritime ship includes a database configured to store a service speed of the maritime ship. The apparatus further includes a processor configured to generate a plurality of state nodes, to determine a plurality of time sets, to append the plurality of time sets to the plurality of state nodes to obtain a plurality of appended state nodes, to generate a plurality of edges based on the plurality of appended state nodes, to generate a graph based on the plurality of appended state nodes and (Continued)

the plurality of edges, to apply a preliminarily generated optimal route algorithm on the graph to obtain a preliminarily defined route path, and to apply a genetic algorithm based on the preliminarily defined route path to obtain the optimal route of the maritime ship.

14 Claims, 13 Drawing Sheets

(56) References Cited

U.S. PATENT DOCUMENTS

| | | | |
|---|---|---|---|
| 2003/0084011 A1* | 5/2003 | Shetty | G06Q 10/047 |
| | | | 706/13 |
| 2005/0216182 A1* | 9/2005 | Hussain | G01C 21/20 |
| | | | 701/532 |
| 2006/0064242 A1* | 3/2006 | Litvack | G01C 21/203 |
| | | | 701/410 |
| 2008/0255757 A1* | 10/2008 | Bruce | G01C 21/20 |
| | | | 701/423 |
| 2008/0300738 A1 | 12/2008 | Coulmeau et al. | |
| 2009/0150012 A1 | 6/2009 | Agam et al. | |
| 2010/0094485 A1 | 4/2010 | Verlut et al. | |
| 2010/0168942 A1* | 7/2010 | Noffsinger | G01C 21/20 |
| | | | 715/764 |
| 2010/0280750 A1* | 11/2010 | Chen | G01C 21/22 |
| | | | 701/465 |
| 2012/0259489 A1* | 10/2012 | Hamamatsu | G01C 21/203 |
| | | | 701/21 |
| 2013/0124088 A1* | 5/2013 | Bruce | G01C 21/203 |
| | | | 701/527 |
| 2014/0032106 A1 | 6/2014 | Ginsberg | |
| 2014/0180584 A1* | 6/2014 | Carnevali | G01C 21/203 |
| | | | 701/538 |
| 2017/0160736 A1 | 6/2017 | Thomas et al. | |
| 2019/0178649 A1* | 6/2019 | Lucus | G08G 3/00 |

FOREIGN PATENT DOCUMENTS

| | | |
|---|---|---|
| GB | 2 555 794 A | 5/2018 |
| JP | 2007-57499 A | 3/2007 |
| JP | 2018-503920 A | 2/2018 |
| KR | 10 2007 0013701 | 1/2007 |
| KR | 10 2018 0111196 | 10/2018 |
| KR | 2018 0111196 A | 10/2018 |
| WO | WO 2016/086278 A1 | 6/2016 |
| WO | WO 2016/136297 A1 | 9/2016 |

OTHER PUBLICATIONS

Helong Wang, "Voyage Optimization Algorithms For Ship Safety And Energy-Efficiency", Thesis For The Degree Of Licentiate Of Engineering, Department of Mechanics and Maritime Sciences, Division of Marine Technology, Chalmers University Of Technology, SE-412 96, Gothenburg, Sweden, 2018, Report No. 1 2018:13, Printed by Chalmers Reproservice, 57 pgs.

Communication Pursuant To Article 94(3) EPC, European Patent Office Action, Postbus 5818, 2280 HV Rijswijk, Netherlands, EPO Form 2001, Dated Nov. 9, 2020, EP Application No. 18 202 074.3, 5 pgs.

Communication Pursuant To Article 94(3) EPC, European Patent Office Action, Postbus 5818, 2280 HV Rijswijk, Netherlands, EPO Form 2001, Dated Sep. 30, 2021, EP Application No. 18 202 074.3, 5 pgs.

Bohlin et al., "Path Planning Using Lazy PRM", Proceedings of the 2000 IEEE International Conference on Robotics & Automation, pp. 521-528, Apr. 2000; 8 pgs.

* cited by examiner

APPARATUS FOR DETERMINING AN OPTIMAL ROUTE OF A MARITIME SHIP

CROSS REFERENCE TO RELATED APPLICATIONS

The present application is a 371 national phase filing of International Application No. PCT/EP2019/077720 by Dokken et al., entitled "AN APPARATUS FOR DETERMINING AN OPTIMAL ROUTE OF A MARITIME SHIP," filed Oct. 14, 2019, which claims priority to European Application Number 18202074.3 by Dokken et al., entitled "AN APPARATUS FOR DETERMINING AN OPTIMAL ROUTE OF A MARITIME SHIP," filed Oct. 23, 2018, which are assigned to the assignee hereof, and which are each incorporated by reference herein in their entirety.

TECHNICAL FIELD

The present disclosure relates to the field of maritime route planning.

BACKGROUND

Conventional maritime route optimization algorithms, such as the isochrone algorithm and the dynamic programming algorithm, often follow similar estimation procedures to determine a ship's optimal sailing route in terms of courses and schedules.

Firstly, waypoints or grids along a ship's voyage area are generated, and candidate routes in terms of trajectories with associated speeds are constructed without considering possible MetOcean conditions encountered by the ship and its performance or response under those conditions. Then, an optimization algorithm is implemented to find the optimal route from those candidates with respect to a specific optimization objective, such as minimum expected time of arrival (ETA) or minimum fuel consumption.

However, specific variables to control a ship's operation are fixed when performing the route optimization algorithm. Therefore, a determined optimal route is usually only a locally optimal route for a ship's voyage between a departure location and a destination location.

SUMMARY

It is an object of the present disclosure to provide an improved apparatus for determining an optimal route of a maritime ship according to the user's needs, including but not limited to: minimum fuel consumption, minimum power consumption, lowest emissions, fastest Estimated Time of Arrival (ETA), care of the cargo during the voyage, and hence rough weather avoidance, safest voyage, least ship structural stress, highest passenger sailing comfort.

This object is achieved by the features of the independent claims. Further implementation forms are apparent from the dependent claims, the description and the figures.

The present disclosure is based on a hybrid routing optimization approach for determining an optimal route of a maritime ship. Examples of the present disclosure may allow to obtain a globally optimal route of the maritime ship.

For this purpose, a potential "optimal path/course" with an increased searching space is generated in order to allow the arrival time or speed at respective waypoints along the path to vary. The graph will be a three-dimensional graph. Then, the preliminary defined optimal path, such as the shortest distance path, is applied on the graph to search for the most optimal-route path using e.g. Dijkstra's algorithm or any other similar algorithms, having a specific estimated time of arrival (ETA). Finally, a genetic algorithm is applied based on the estimated optimal-path route to further improve the local waypoints along the optimal route as provided by the optimization algorithm in order to obtain the overall optimal-route path of the ship. The genetic algorithm relates to a metaheuristic inspired by the process of natural selection (i.e., the best individuals are selected for reproduction of the next generation) that belongs to a larger class of evolutionary algorithms (EA). The genetic algorithm may provide a solution to the optimization problem, e.g. by relying on bio-inspired operators such as mutation, crossover, and/or selection.

The solution would be that the output of the Dijkstra's algorithm yields a series of optimum routes corresponding to different ETAs. Based on a specific optimization objective, one potential optimal route will be selected from the Dijkstra's algorithm generated routes. Then, new searching areas in both space and time will be refined by adding some random deviation to the initially generated optimal route. The deviations defined here have two sets of random variables, one for the deviations of the geometrical waypoints along the route, and the other for the deviations of arrival times at each waypoint. This leads to a large number of sample ship routes around the optimal route being generated. Then the fitness value (i.e. the ship performance model such as fuel cost, ship motions, etc.) is assessed for each individual ship route as a criterion for the selection of breeding in the algorithm. Then the fitness values of all individual sample routes composed of a series of sub-paths are calculated by the fitness function. Finally, the selection of the "parent" candidate routes for the breeding of next generation of routes is performed, and all the routes generated from the previous steps are used for the route optimization. For this, the potential parent routes are separated from the rest of the routes at the chosen stage and then two randomly chosen parent routes for the crossover operation are selected. These two selected parent routes are to be included with respect to geometrical and arrival-time differences. Finally, transfusion is achieved by adding the new selected parent routes are added into the input optimum/reference route.

According to a first aspect, the present disclosure relates to an apparatus for determining an optimal route of a maritime ship, wherein the maritime ship is to depart at a predetermined departure location at a predetermined departure time, and wherein the maritime ship is to arrive at a predetermined destination location at a predetermined destination time. This route optimization can be performed in accordance to the user's needs, including but not limited to: minimum fuel consumption, minimum power consumption, lowest emissions, fastest Estimated Time of Arrival (ETA), care of the cargo during the voyage, and hence, rough weather avoidance, safest voyage, least ship structural stress, highest passenger sailing comfort. The apparatus comprises a database configured to store a predetermined service speed of the maritime ship. The apparatus further comprises a processor configured to generate a plurality of state nodes based on the predetermined departure location, the predetermined destination location, and the predetermined service speed, each state node indicating a respective location, to determine a plurality of time sets based on the plurality of state nodes, the predetermined departure time, and the predetermined destination time, the plurality of time sets being associated with the plurality of state nodes, each time set indicating a range of arrival times associated with a respective state node, to append the plurality of time sets to the plurality of state nodes to obtain a plurality of appended state nodes, to generate a plurality of edges based on the plurality of appended state nodes, each edge of the plurality of edges being associated with a pair of appended state nodes of the plurality of appended state nodes, each edge being associated with a respective optimization cost, to generate a graph based on the plurality of appended state nodes and the plurality of edges, to apply a preliminarily generated optimal route algorithm on the graph to obtain a of the maritime ship between the departure location and the destination location, and to apply a genetic algorithm based on the preliminarily defined optimal-path route to obtain the optimal route of the maritime ship.

In an example, the database is further configured to store a predetermined ship performance model, wherein the processor is further configured to determine time constraint information based on the plurality of time sets and the predetermined ship performance model, and wherein the processor is further configured to generate the plurality of edges further based on the time constraint information. Thus, the number of edges within the plurality of edges may be reduced based on the achievable performance of the maritime ship; thereby allowing for an increased performance of the preliminarily generated optimal route algorithm.

The predetermined ship performance model may e.g. represent a performance of the maritime ship, e.g. a range of the maritime ship, a turn radius of the maritime ship, a maneuverability of the maritime ship, a maximum speed of the maritime ship, and/or a shaft power of the maritime ship.

In an example, the processor is further configured to generate the graph further based on the predetermined ship performance model. Thus, the number of state nodes within the plurality of state nodes may be reduced based on the achievable performance of the maritime ship; thereby allowing for a more efficient generation of the graph.

In an example, the database is further configured to store predetermined bathymetry information and the squat effect, wherein the processor is further configured to determine geographic constraint information based on the plurality of state nodes and the bathymetry information, including the squat effect, and wherein the processor is further configured to generate the plurality of edges further based on the geographic constraint information. Thus, the number of edges within the plurality of edges may be reduced based on the bathymetry and squat effect information; thereby allowing for an increased performance of the preliminarily generated optimal route algorithm.

In an example, the processor is further configured to generate the plurality of edges further based on the plurality of time sets. Thus, the plurality of edges may be generated more efficiently.

In an example, the database is further configured to store predetermined weather information, wherein the processor is further configured to generate the graph further based on the predetermined weather information. Thus, the number of state nodes within the plurality of state nodes may be reduced based on the weather information; thereby allowing for a more efficient generation of the graph.

In an example, the respective optimization cost is one of the following optimization costs: a power consumption of the maritime ship, a fuel consumption of the maritime ship, an emission of the maritime ship, for example a $CO_2$, Sox, NOx, or PM emission of the maritime ship, a risk of cargo loss of the maritime ship, a fatigue damage in the structure of the maritime ship. Thus, optimization costs pertinent to efficient route planning may be used.

In an example, the graph is a three-dimensional graph, and wherein the graph has a first dimension with respect to longitude, a second dimension with respect to latitude, and a third dimension with respect to arrival time. Thus, an increased search space with regard to conventional route optimization approaches may be used.

In an example, the preliminarily generated optimal route algorithm is a Dijkstra algorithm, a Bellman-Ford algorithm, an A* search algorithm, a Floyd-Warshall algorithm, a Johnson's algorithm, or a Viterbi algorithm. However, any other algorithm may also be applied which provides a preliminarily generated optimal-route path. Thus, the optimal-route path route may efficiently be determined.

In an example, the processor is further configured to determine a population of routes comprising a plurality of individuals based on the preliminarily generated optimal route, and to apply the genetic algorithm, or any similar algorithms, such as by such as the Dijkstra' algorithm, Isochrone method, or Dynamic programming, etc., on the plurality of individuals. Thus, the genetic algorithm may efficiently be applied.

In an example, each individual of the plurality of individuals is associated with a respective location deviation and/or a respective arrival time deviation with regard to the preliminarily generated optimal route, and wherein the respective location deviations and/or the respective arrival time deviations of the plurality of individuals are different from one another. The respective deviations in location and/or arrival time with regard to the preliminarily generated optimal route may e.g. be determined randomly in order to obtain the plurality of individuals. Thus, the genetic algorithm may efficiently be applied.

In an example, the processor is further configured to perform at least one selection step, mutation step, transfusion step, and/or crossover step on the plurality of individuals. The aforementioned steps may be performed in any combination and/or repeatedly. The processor may be configured to modify the plurality of individuals after having performed any one of the aforementioned steps. Thus, the genetic algorithm may efficiently be applied.

In an example, the processor is further configured to select an individual from the plurality of individuals, wherein the selected individual is associated with an optimal total optimization cost, and wherein the selected individual forms the optimal route of the maritime ship. The total optimization cost may be the sum of all optimization costs associated with edges of the respective route. Thus, the global optimal route can efficiently be determined by the genetic algorithm.

In an example, the processor is further configured to modify the graph and/or the plurality of edges based on the plurality of individuals, in particular based on the selected individual. Thus, the graph and/or the plurality of edges may efficiently be refined.

According to a second aspect, the present disclosure relates to a method for operating an apparatus for determining an optimal route of a maritime ship, wherein the maritime ship is to depart at a predetermined departure location at a predetermined departure time, and wherein the maritime ship is to arrive at a predetermined destination location at a predetermined destination time. The apparatus comprises a database and a processor, wherein the database is configured to store a predetermined service speed of the maritime ship. The method comprises generating, by the processor, a plurality of state nodes based on the predetermined departure location, the predetermined destination location, and the predetermined service speed, each state node indicating a respective location, determining, by the processor, a plurality of time sets based on the plurality of state nodes, the predetermined departure time, and the predetermined destination time, the plurality of time sets being associated with the plurality of state nodes, each time set indicating a range of arrival times associated with a respective state node, appending, by the processor, the plurality of time sets to the plurality of state nodes to obtain a plurality of appended state nodes, generating, by the processor, a plurality of edges based on the plurality of appended state nodes, each edge of the plurality of edges being associated with a pair of appended state nodes of the plurality of appended state nodes, each edge being associated with a respective optimization cost, generating, by the processor, a graph based on the plurality of appended state nodes and the plurality of edges, applying, by the processor, a preliminarily generated optimal route algorithm on the graph to obtain a preliminarily generated optimal-route path of the maritime ship between the departure location and the destination location, and applying, by the processor, a genetic algorithm based on the preliminarily generated optimal route to obtain the optimal route of the maritime ship.

The method may be performed by the apparatus. Further features of the method directly result from the features or the functionality of the apparatus.

According to a third aspect, the present disclosure relates to a computer program comprising a program code for performing the method when executed by a processor.

The principles of the present disclosure can be implemented in hardware and/or software.

BRIEF DESCRIPTION OF THE DRAWINGS

Examples of the present disclosure will be described with respect to the following figures.

DETAILED DESCRIPTION

Figure 1:
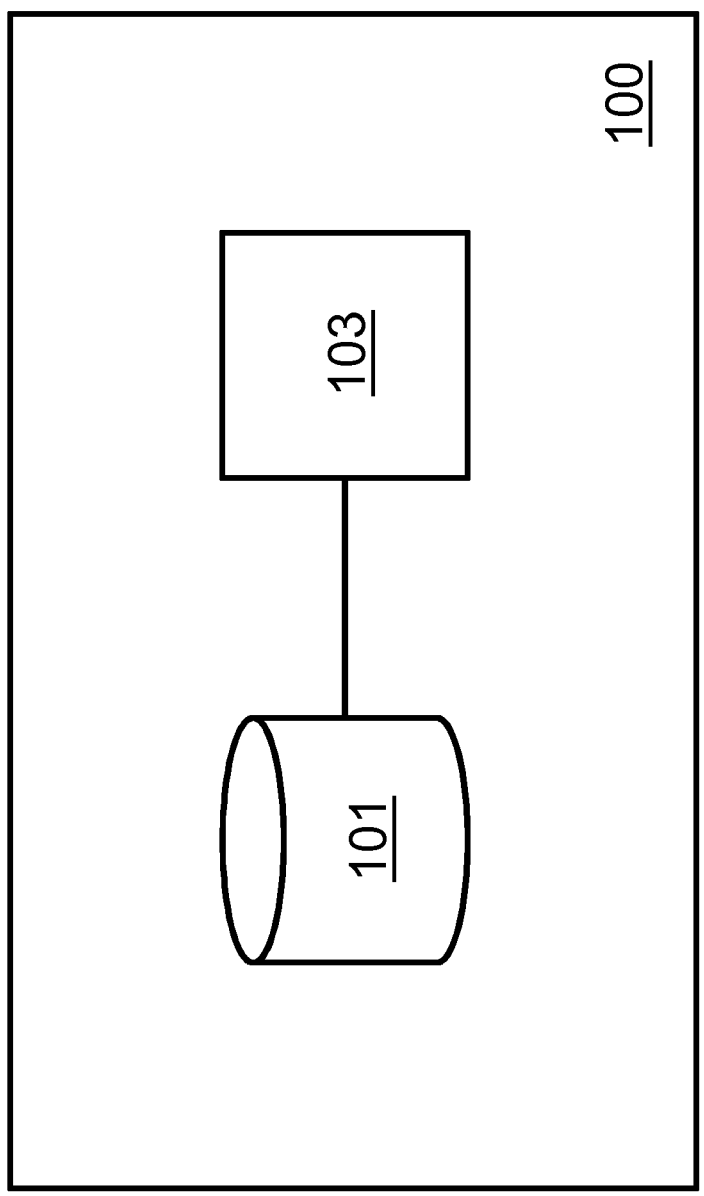
FIG. 1 shows a schematic diagram of an apparatus for determining an optimal route of a maritime ship.

FIG. 1 shows a schematic diagram of an apparatus 100 for determining an optimal route of a maritime ship, wherein the maritime ship is to depart at a predetermined departure location at a predetermined departure time, and wherein the maritime ship is to arrive at a predetermined destination location at a predetermined destination time, which can be performed in accordance to the user's needs, including but not limited to: minimum fuel consumption, minimum power consumption, lowest emissions, fastest Estimated Time of Arrival (ETA), care of the cargo during the voyage, and hence, rough weather avoidance, safest voyage, least ship structural stress, highest passenger sailing comfort.

The apparatus 100 comprises a database 101 configured to store a predetermined service speed of the maritime ship. The apparatus 100 further comprises a processor 103 configured to generate a plurality of state nodes based on the predetermined departure location, the predetermined destination location, and the predetermined service speed, each state node indicating a respective location, to determine a plurality of time sets based on the plurality of state nodes, the predetermined departure time, and the predetermined destination time, the plurality of time sets being associated with the plurality of state nodes, each time set indicating a range of arrival times associated with a respective state node, to append the plurality of time sets to the plurality of state nodes to obtain a plurality of appended state nodes, to generate a plurality of edges based on the plurality of appended state nodes, each edge of the plurality of edges being associated with a pair of appended state nodes of the plurality of appended state nodes, each edge being associated with a respective optimization cost, to generate a graph based on the plurality of appended state nodes and the plurality of edges, to apply a preliminarily generated optimal route algorithm on the graph to obtain a preliminarily defined optimal-route path of the maritime ship between the departure location and the destination location, and to apply a genetic algorithm based on the preliminarily defined optimal-route path to obtain the optimal route of the maritime ship.

Figure 2:
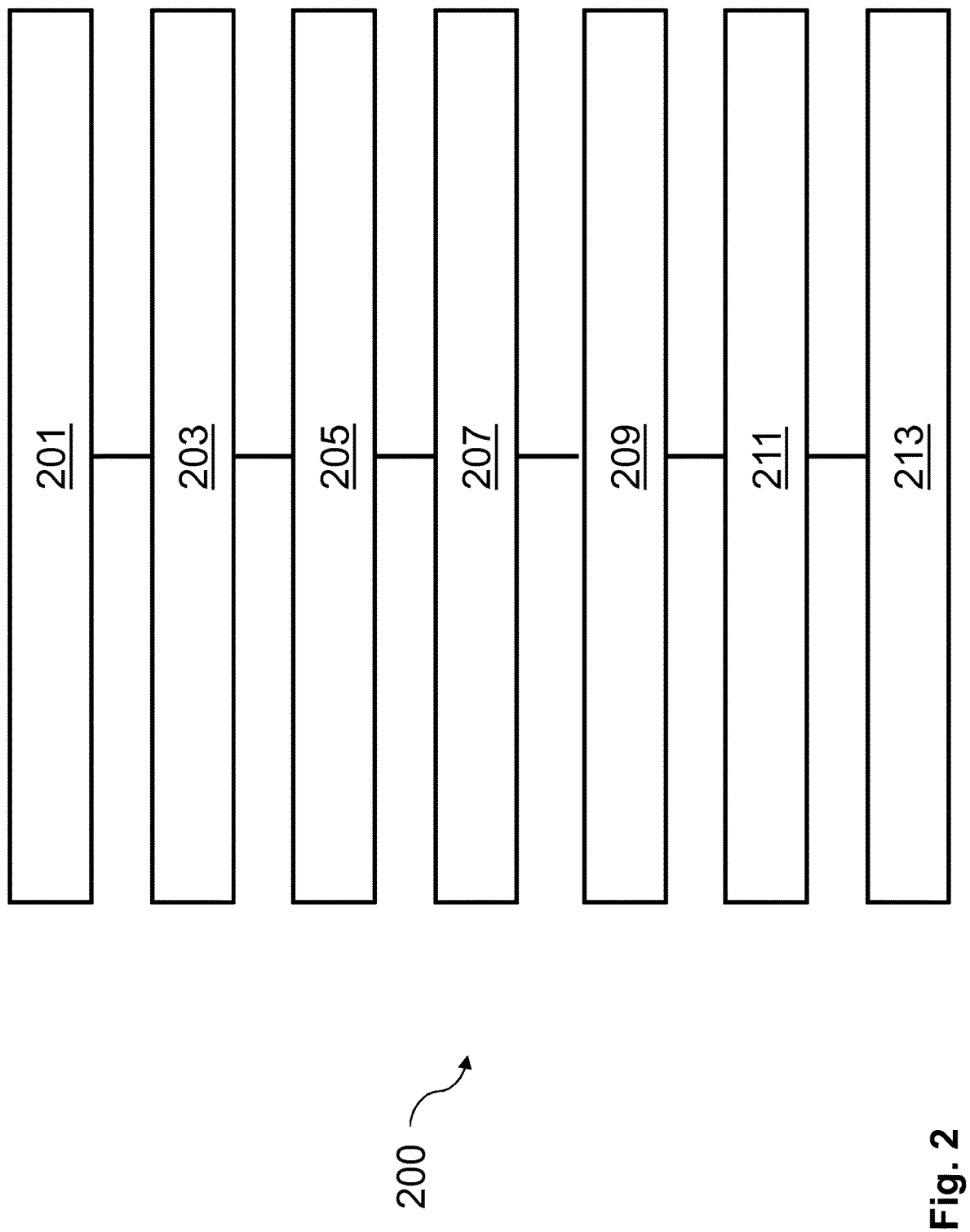
FIG. 2 shows a schematic diagram of a method for operating an apparatus for determining an optimal route of a maritime ship.

FIG. 2 shows a schematic diagram of a method 200 for operating an apparatus for determining an optimal route of a maritime ship, wherein the maritime ship is to depart at a predetermined departure location at a predetermined departure time, and wherein the maritime ship is to arrive at a predetermined destination location at a predetermined destination time in accordance to the user's needs. The apparatus comprises a database and a processor, wherein the database is configured to store a predetermined service speed of the maritime ship.

The method 200 comprises generating 201, by the processor, a plurality of state nodes based on the predetermined departure location, the predetermined destination location, and the predetermined service speed, each state node indicating a respective location, determining 203, by the processor, a plurality of time sets based on the plurality of state nodes, the predetermined departure time, and the predetermined destination time, the plurality of time sets being associated with the plurality of state nodes, each time set indicating a range of arrival times associated with a respective state node, appending 205, by the processor, the plurality of time sets to the plurality of state nodes to obtain a plurality of appended state nodes, generating 207, by the processor, a plurality of edges based on the plurality of appended state nodes, each edge of the plurality of edges being associated with a pair of appended state nodes of the plurality of appended state nodes, each edge being associated with a respective optimization cost, generating 209, by the processor, a graph based on the plurality of appended state nodes and the plurality of edges, applying 211, by the processor, a preliminarily generated optimal route algorithm on the graph to obtain a preliminarily defined optimal-route path of the maritime ship between the departure location and the destination location, and applying 213, by the processor, a genetic algorithm based on the preliminarily generated optimal path route to obtain the optimal route of the maritime ship.

Figure 3:
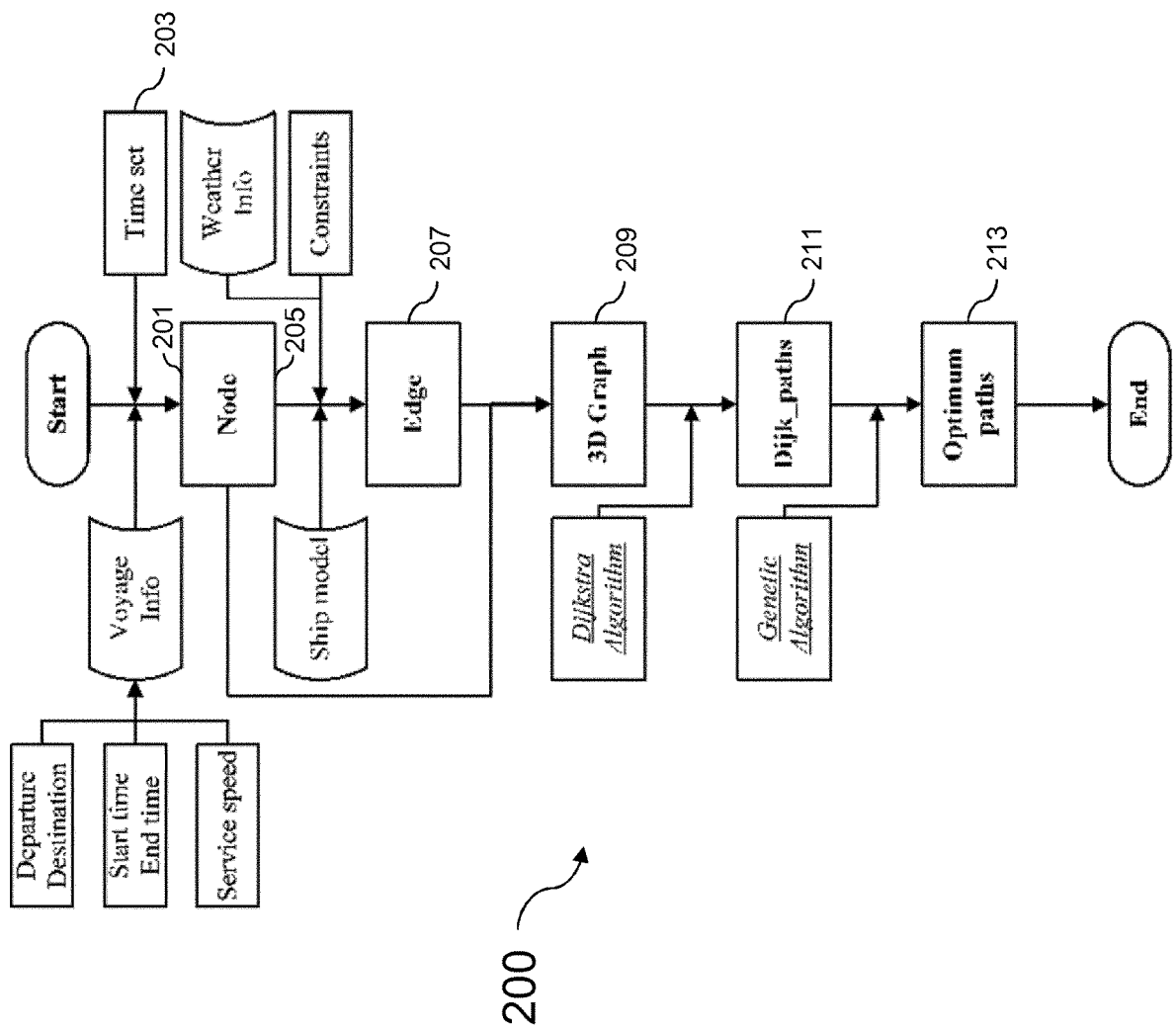
FIG. 3 shows a schematic diagram of a method for operating an apparatus for determining an optimal route of a maritime ship where further examples of the method 200 (FIG. 2) are displayed in more detail.

FIG. 3 shows a schematic diagram of a method 200 for operating an apparatus for determining an optimal route of a maritime ship. The method 200 comprises the same features as the method 200 as depicted in FIG. 2. In the following, further examples of the method 200 will be described in more detail. A route of a maritime ship may be defined by a series of waypoints forming a trajectory of the maritime ship and the associated time. The waypoints and time in a route can be used to directly calculate the series of the speed, e.g. the speed through water or the speed over ground, and/or the heading of the maritime ship for each waypoint along the route, based on the received MetOcean information around the ship's sailing area. Additionally, the shaft power of the maritime ship may be calculated. In the following, for a simple description of the optimization approach, the sailing variables to define a route are denoted as follows:

$\vec{X}(i,j,t)$: State (waypoint) variable, where i, j, t represent longitude, latitude and time, respectively.

$\vec{U}(v, \theta)$: Route optimization control variables, where v is velocity, $\theta$ is heading angle. As the route is discretized into a series of sub-paths. The control variable can be considered as an attribute of a sub-path between two states in adjacent stages.

$\vec{W}(X)$: Weather conditions at one state (wave, current, wind).

$\vec{C}$: Constraints such as geometric constraint; control constraint (bathymetry constraint, land crossing constraint, maximum continuous rating constraint, etc.)

An instantaneous cost function to calculate the optimization objective at each state can be denoted by:

$$I = f(\vec{X}, \vec{W}, \vec{C}) \quad (1)$$

The total cost for a route/voyage can be obtained by $$T(t_e) = \int_{t_s}^{t_e} f(\vec{X}, \vec{W}, \vec{C}) dt \quad (2)$$

where $t_s$, $t_e$ are the departure time and destination time, respectively. The optimization cost of a route can be expressed in different forms such as minimum fuel consumption (optimization cost expressed in terms of fuel), minimum power consumption (optimization cost expressed in terms of power), lowest emissions (optimization cost expressed in terms of emissions), fastest Estimated Time of Arrival according to the nature of the cargo (optimization cost expressed in terms of sailing time), rough weather avoidance according to the nature of the cargo (optimization cost expressed in terms of ship motions), safest voyage (optimization cost expressed in terms of safety related to ship motion and the chance of encountering storms/bad weather potential sea ice), least ship structural stress (optimization cost expressed in terms of stress on ship hull), highest passenger sailing comfort (optimization cost expressed in terms of ship motion).

The total cost in Eq. (2) can be derived by discretizing a route into a series of stages, e.g., n-stages. The optimization cost for each stage can be estimated individually, and then the total optimization cost may be calculated as follows:

$$T(t_e) = \sum_{i=1}^{n} f(\vec{X_i}, \vec{W_i}, \vec{C}) \Delta t_i \quad (3)$$

The core function as in Eq. (3) for route optimization is exemplarily the fuel consumption during a ship's voyage. Furthermore, the ETA may be set to be fixed and used as one constraint. This implies that $$t_e - t_s = \sum_{i=1}^{n} \Delta t_i = \text{constant} \quad (4)$$

In the following, the implementation of the optimization approach for route planning is described in more detail. A ship can be routed across numerous different routes to reach its destination. The route chosen for a ship's actual voyage duration may be optimized to achieve specific objectives e.g. fuel consumption, emission, risk of cargo loss, voyage duration, cargo safety, etc. In the following, an exemplary objective chosen for route optimization is to minimize a fuel consumption during the voyage, while still maintaining its expected time of arrival (ETA). A hybrid routing optimization algorithm is proposed to solve the routing problem. It is composed of both an initial, preliminarily generated optimal route algorithm, e.g. a Dijkstra algorithm, Dynamic Programming, or Isochrone method, and a genetic algorithm, as explained above.

Let a route be denoted by a graph system G=(V, A), wherein V is a set of vertices/nodes, and A is a set of directed edges/arcs composed of various pairs of nodes that are ordered in certain ways. Every directed edge is assigned with a weight/cost. The preliminarily generated optimal route algorithm, e.g. the Dijkstra algorithm, is used for finding the path (composed of a series of state nodes) between the departure location and the destination location with the lowest cost on the weighted graph. Most often, when the number of state nodes becomes large, the algorithm will require a huge computational effort to find the shortest-path solution. In order to reduce the effort while still keeping the capability of finding an optimal path, a genetic algorithm is employed for improving the individual candidate paths (i.e. routes) found by the preliminarily generated optimal route algorithm. Therefore, the hybrid routing optimization algorithm is also able to optimize a route by controlling both speed and/or heading and/or shaft power.

In order to apply the shortest-path algorithm, e.g. the Dijkstra algorithm, to solve the routing problem, a graph consisting of possible routes is generated first. For the optimal ship route, the algorithm does not only cover the geometric domain but also the time domain, a three-dimensional (3D) graph that is discretized in form of waypoints or a grid with longitude, latitude and time may be applied. In the graph, the nodes or vertices (i.e. route waypoints) may be considered as states as defined previously. Therefore, any sub-paths or edges in a trajectory can be composed of connections between state nodes in different stages. From the departure location to the destination location, there may be numerous paths for every possible ETA. Note that if the time variable is fixed, various information regarding a connection/edge/arc can be obtained. Then, every connection/edge/arc can be assigned with an optimization cost as a weight. The preliminarily generated optimal route algorithm will return the preliminarily generated optimal route within the graph between the source node (i.e. the departure location) to the target node (i.e. the destination location).

As explained above, the genetic algorithm is based on a metaheuristic inspired by the theory of evolution, using concepts such as natural selection, reproduction, genetic heritage and mutation. It may also be used as an evolutionary algorithm for the routing problem. A problem of utilizing a genetic algorithm to solve the routing problem is how to create suitable models for the genetic algorithm. An element in a genetic algorithm is the so-called fitness function or objective function, which is actually a variable to be optimized by the algorithm. The aim of the genetic algorithm is to find the minimum value of the fitness function. For an optimized route planning, the objective/fitness function may be defined as fuel consumption, time cost, or other objectives related to a ship's navigation. In the genetic algorithm, a node may be any waypoint associated with a fitness value, which may be computed by the pre-defined fitness function. A simple example for the routing problem can be defined as follows. Let the fitness/objective function be defined by, $$f(X_1, \ldots, X_n) = \sum_{i=1}^{n} g(X_i) \quad (5)$$

wherein g is a fuel consumption function for a route state $X_i$ and f is the total fitness value, e.g. a total fuel consumption as a cost consumed by a route, which is composed of the states $X_1, \ldots X_n$ as an individual. In particular, the total fitness value f may be regarded as a total optimization cost.

Even for a simple problem in a routing system, which may only change a geometrical variable (longitude and latitude), the searching space for finding an optimal route by a genetic algorithm, i.e. the discretized space, may grow exponentially as the number of elements increases in an individual. Therefore, it may not be efficient to implement a genetic algorithm in the form of a large number of individuals as discussed above. Different approaches for the genetic algorithm may be applied. For example, a multi-objective genetic algorithm, which stochastically solves a discretized nonlinear optimization problem may be applied. For an efficient optimization, a sailing course and velocity profiles may be represented by parametric curves. Exemplary individuals may e.g. be based on two sets of parameters that control the parametric curves used to describe the ship course and velocity. Furthermore, a multi-criteria evolutionary routing algorithm may be applied.

An exemplary approach may be based on a normal genetic algorithm iterative process of population development. This approach may give the result of a Pareto-optimal set of solutions. The individuals for the first population may be the set of 4 routes, an orthodrome, a loxodrome, a time-optimized isochrone route and a fuel-optimized isochrone route. Furthermore, a genetic algorithm for solving a multi-modal objective function problem may be applied. The variation of latitude and a propeller revolution number in each waypoint may be considered as individuals within the population. This means that an individual may be associated with a set of parameters, which may e.g. influence both geographical location and revolution number. The challenges of implementing only a genetic algorithm or evolutionary algorithm to solve a routing problem can be summarized in two categorizes, i.e. geographical waypoints and time/speed. On one hand, a route may consist of many waypoints. Each waypoint may be a potential variable, which can be one element of an individual and may also be dependent on a former waypoint. On the other hand, the arrival time associated with each waypoint within a route may influence the final solution of the route optimization problem. It may be challenging to find an optimal solution with two sets of dependent variables using any genetic or evolutionary algorithm. However, alternative approaches may also be applied, such as in situ measurements that will be provided by the vessels using the system to have to most updated and correct info on the area it covers.

In the following, the optimization approach using the hybrid routing optimization algorithm is described in more detail. An aim for utilizing the genetic algorithm is to improve the optimal result given by the preliminarily generated optimal route algorithm, which may be a Dijkstra algorithm as an example. Alternatively, a Bellman-Ford algorithm, an A* search algorithm, a Floyd-Warshall algorithm, a Johnson's algorithm, a Viterbi algorithm, or any other shortest-path algorithm may be applied. The individuals in this algorithm may be a small range of variations for searching nodes/waypoints and arrival time. Thus, it may be easy to find the optimal route of the maritime ship, which may be very close to the global optimal. A graph, in particular a 3D weighted graph, may be generated. The preliminarily generated optimal route algorithm is implemented to work on the graph, in particular on the 3D weighted graph. The genetic algorithm will provide adjustments based on the solution that the preliminarily generated optimal route algorithm provides. Theoretically, the preliminarily generated optimal route algorithm may be able to obtain an optimal solution, which may be extremely close to the global optimal solution in a graph with very fine resolution. However, the computational effort for both constructing the graph and implementing the preliminarily generated optimal route algorithm to work on the graph may be tremendous. Therefore, the preliminarily generated optimal route-algorithm, e.g. the Dijkstra algorithm or any other similar algorithm, may be implemented having a normal-resolution graph and applying the genetic algorithm to further optimize the obtained ship route provided by the preliminarily generated optimal route algorithm. The voyage information such as the departure time and the destination time, the navigation strategy (e.g. power or RPM operation), as well as the grid system may be predefined. Furthermore, the ship performance model as well as the fitness function, the weather information and further sailing constrains, may be used as an input for the route optimization.

Figure 4:
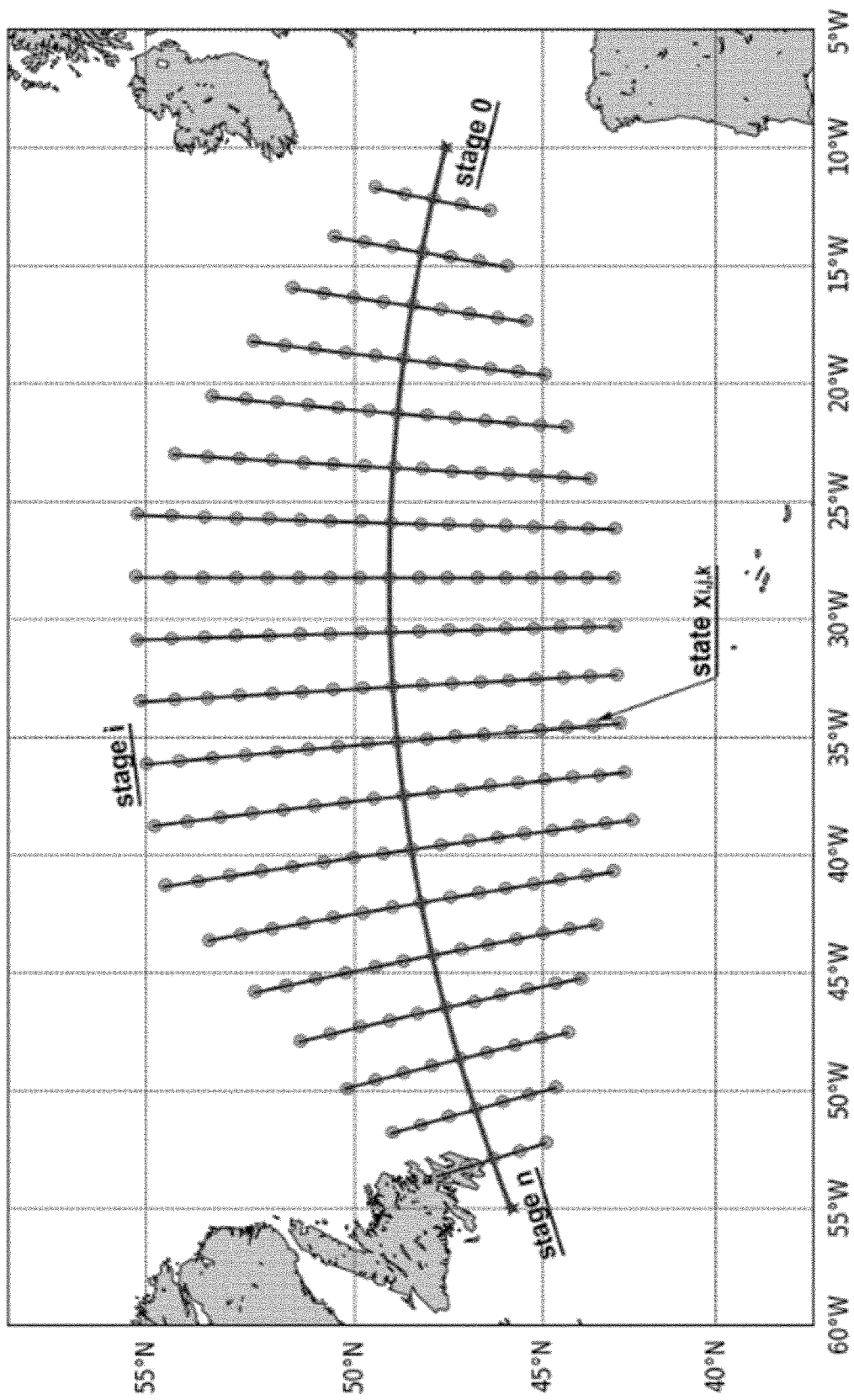
FIG. 4 shows a schematic diagram of a plurality of state nodes being arranged to form a grid.

FIG. 4 shows a schematic diagram of a plurality of state nodes being arranged to form a grid. Each state node of the plurality of state nodes is associated with a respective location; thereby defining a waypoint of a route. Firstly, the plurality of state nodes is generated to define the searching area covering a ship's potential voyage trajectory. Specific route planning is based on the shortest distance between the departure location and the destination location. These routes are also named as great circle routes, which may be used as a reference for the grid/state node generation in a route optimization problem. Based on the great circle routes, other state nodes to be defined along further great circles may be perpendicular to the base path. The pseudocode to generate the plurality of state nodes being arranged to form a grid is given below:

| State Node / Waypoint / Grid generator |
| --- |
| Input: dep: departure; des: destination;<br>    v: service speed;<br>    Δt: time interval between stages;<br>    η: transverse resolution;<br>    num_node: number of node in each stage.<br>Output: Nodes<br>Start:<br>    GC_distance←GC_length(dep, des)<br>    Δs ← vΔt<br>    Num_stage←Total_dist / Δs<br>    For i in Num_stage:<br>        CrossNodes←NodeGen(num_node[i], η)<br>        Nodes[i]←CrossNodes<br>Return Nodes |

One example of such a generated grid is given in FIG. 4. As it is shown, the entire ship voyage may be divided into n stages. For each stage, there may be $k_i$, i=1,2, . . . n possible state nodes associated with geographic locations and arrival times. For each pre-defined state node, a ship may reach it at different time slots, which are named as "timeset".

Figure 5:
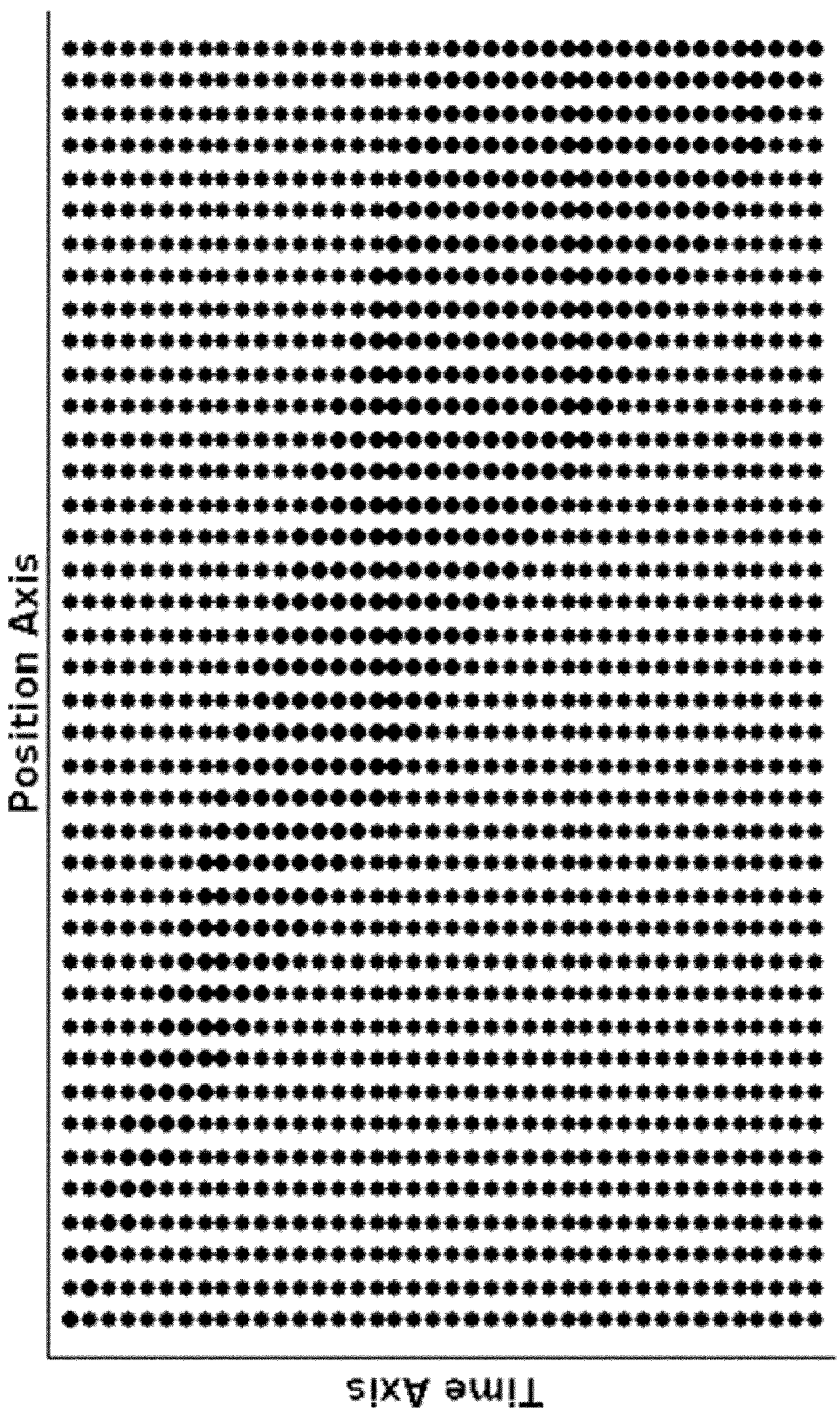
FIG. 5 shows a schematic diagram of a plurality of time sets associated with a plurality of state nodes at different stages.

FIG. 5 shows a schematic diagram of a plurality of time sets associated with a plurality of state nodes at different stages. A time set may be defined statically based on which stage the state node is located. The time set may be assigned with every state node. The diagram illustrates how the time axis is assigned with each state node. In the diagram, the round dots, in contrast to the star-like dots, represent possible accessible time sets for the node state in various stages. The generation of those time sets is briefly described as follows:

Let the departure time denote by ts, the destination time denoted by $t_e$, and the ETA being calculated as $\Delta t = t_e - t_s$.

First step: initialize the time range set as $t \in [t_s, t_s + 1.5 \times \Delta t]$.

Second step: define time ranges that can reach/access to different states on a stage. This step may only give a rough accessible time range for adjacent stages. Further constraints will be explained in the following.

Figure 6:
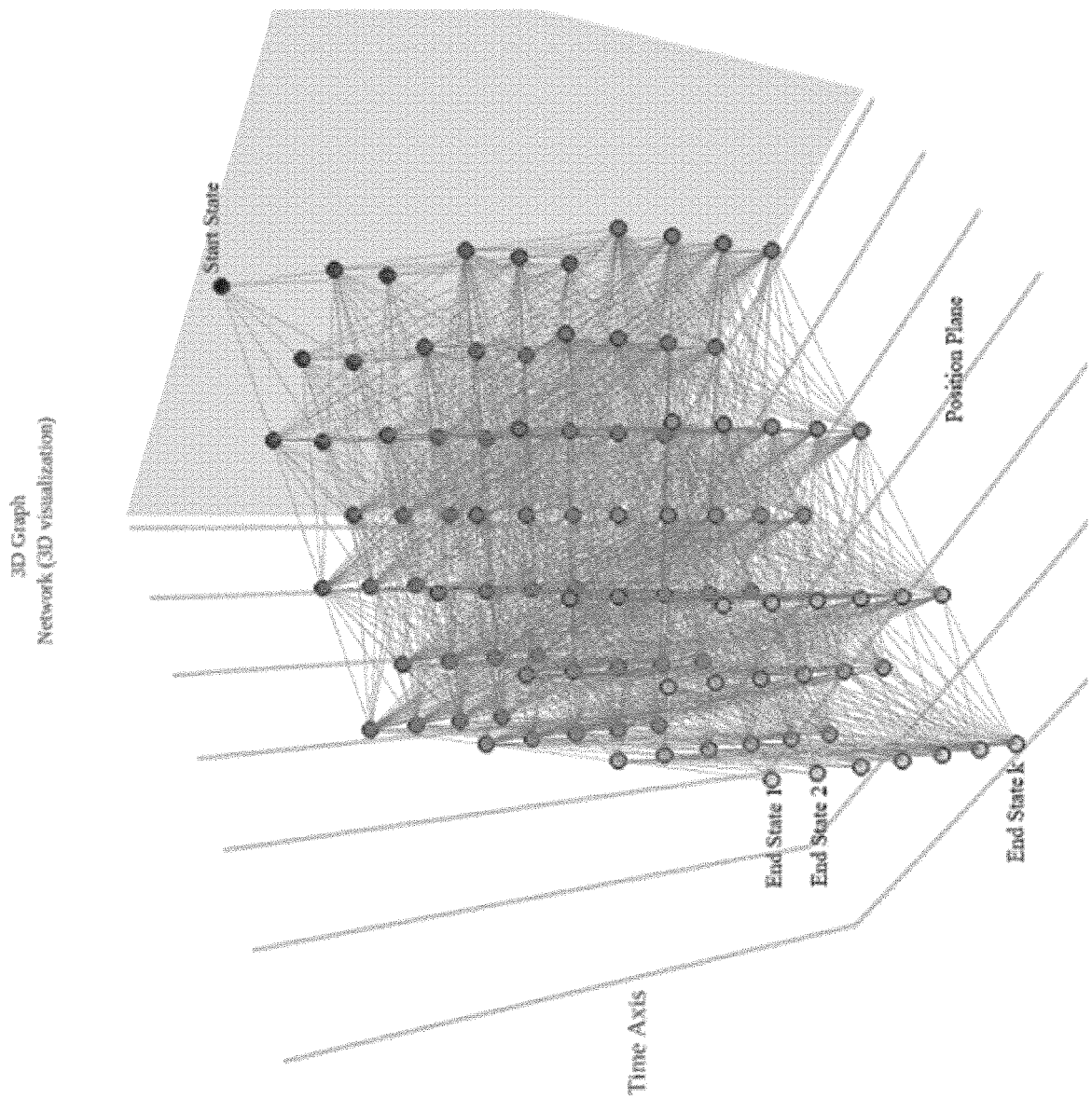
FIG. 6 shows a schematic diagram of a three-dimensional graph having a plurality of state nodes and a plurality of edges.

FIG. 6 shows a schematic diagram of a three-dimensional graph having a plurality of state nodes and a plurality of edges. In the hybrid routing optimization approach, a grid may be composed of pre-defined waypoints/state nodes, which may form sailing edges. The plurality of edges may e.g. connect respective state nodes between adjacent stages. As a state node may contain information regarding location and time, an edge may also contain further information such as distance, heading angle, weather information, estimated cost weight etc., which can be calculated and assigned to the respective edge. When creating the grid with the plurality of edges, specific constraints may also be taken into account.

Such constraints may e.g. comprise geographic constraints. Within the grid, edges typically may not cross land areas. The plurality of edges may not pass state nodes with limited water depth, where a ship may not sail. The plurality of edges may not exceed a maximum sailing distance, which may reduce unreasonable connections between respective state nodes on adjacent stages. Such constraints may e.g. comprise further feasible constraints. The speed of the maritime ship may e.g. not exceed or be lower than a certain value due to the limitation of the ship's engine power and the specifications of operation efficiency.

Considering the constraints described above, reasonable edges can be generated. The pseudocode is given as follows:

| Edge generation |
| --- |
| Input: Nodes;<br>    max_dist: maximum distance ship can go;<br>    S: ship performance model;<br>    E: weather information;<br>Output: Graph<br>Start:<br>For nodes between two adjacent stages:<br>    If (path between two nodes > bath(dl))<br>    and (distance between two nodes < max_dist):<br>        speed = S.estimate_v(nodes, E)<br>        if speed in SpeedRange:<br>            weight = S.estimate_power(speed, E)<br>            Graph.add_edge(node1, node2, [weight])<br>Return Graph |

One example of a generated graph is shown in FIG. 6. As shown, the graph is composed of three-dimensional variables. From the start state node to the final destination state node, the grid is divided into n stages. There are several state nodes composed of geographic locations and associated arrival time (also related to sailing speeds along the state edge). In the end, the algorithm may generate n end states (candidate routes), which a ship can follow to be sailing the whole voyage. These n end states will form a Pareto front of the routing optimization with respect to multi-objectives, i.e., optimal sailing ETA, minimum fuel consumption, and/or minimum emission for each candidate route.

After generating the grid, e.g. the 3D geographic state nodes shown in FIG. 6 and the associated time set for each state node as shown in FIG. 5, the preliminarily generated optimal route algorithm, e.g. the Dijkstra algorithm or any other similar algorithm, may be used to find candidate optimal routes with a series of ETAs. Those candidate ship routes may be refined by the genetic algorithm to provide the optimal solution for route optimization.

The implementation of the hybrid route optimization algorithm is given by the following pseudocode, wherein the preliminarily generated optimal route algorithm and the genetic algorithm used in the code are briefly presented as well.

| Hybrid model for ship route optimization |
| --- |
| Input: dep: departure; des: destination; v: service speed;<br>    st: start time; et: end time; E: weather information;<br>    S: ship performance model; B: bathymetry;<br>    Dic: other setting parameters<br>Output: optimal route and corresponding speed at each node<br>Start:<br>    Nodes←NodeGenerator(dep, des, v, **Dic)<br>    GeoC←GeoConstraint(Nodes, B)<br>    Timeset←TimeGenerator(Nodes, st, et **Dic)<br>    TimeC←TimeConstraint(Timeset, S)<br>    Nodes←AddTimeAxis(Nodes, Timeset)<br>    Edges←AddEdge(Nodes, Timeset, GeoC, TimeC)<br>    Graph←GraphGenerator(Nodes, Edges S, E, **Dic)<br>    Dijk_path←Dijkstra_path(Graph)<br>    Final_path←GeneticA(Dijk_path)<br>Return Final_path |

Figure 7:
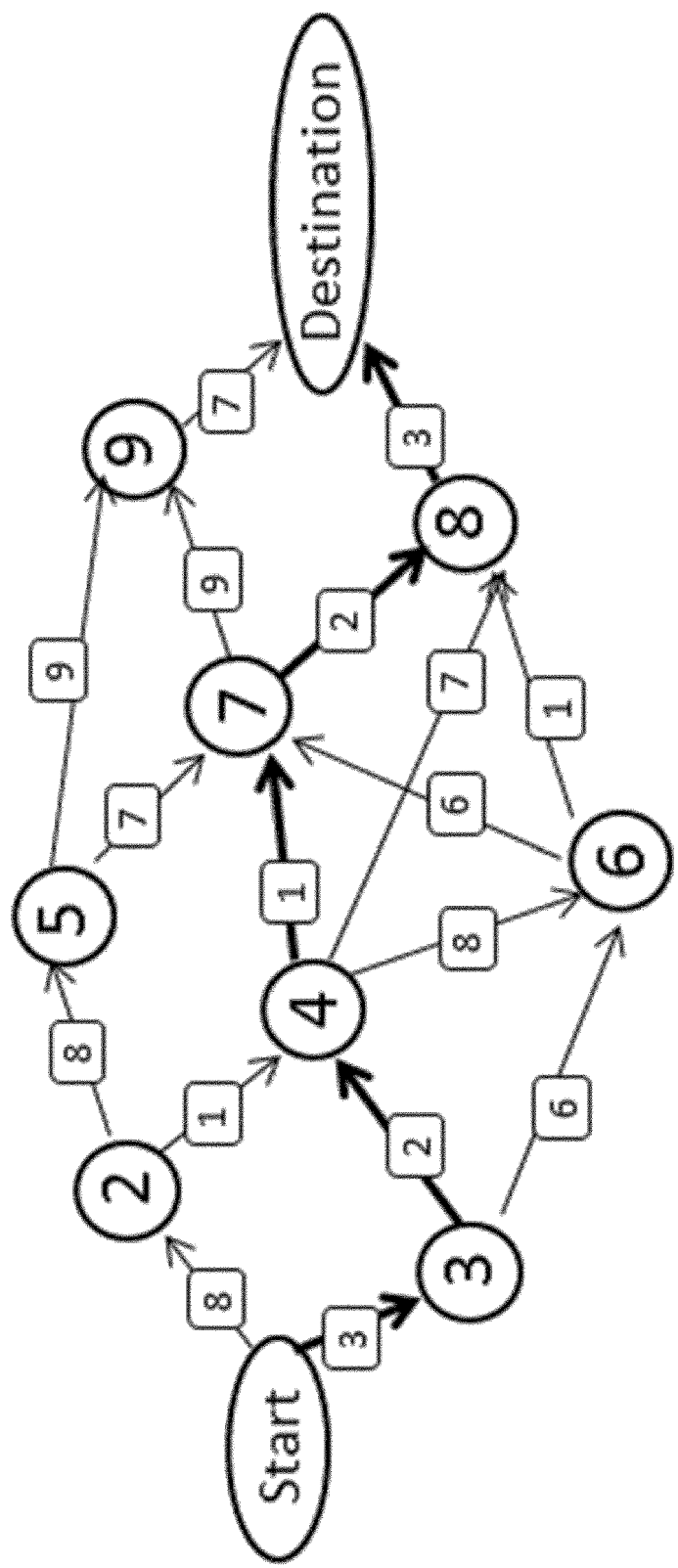
FIG. 7 shows a schematic diagram of a simplified graph having a plurality of state nodes and a plurality of edges.

FIG. 7 shows a schematic diagram of a simplified graph having a plurality of state nodes and a plurality of edges, wherein a Dijkstra algorithm as a preliminarily generated optimal route algorithm is applied on the simplified graph.

The Dijkstra algorithm may be applied on the graph to provide an optimal route for different ETAs. Each route may comprise state nodes with information of longitude, latitude and arrival time. The Dijkstra algorithm works by visiting edges in the graph starting with the starting node. It follows two basic principles: firstly, a sub-route of a shortest-path route is itself a shortest-path route, and secondly, with a given shortest distance, x, between points A and C, a path going from point A to C through a third point B will always be of a distance greater than or equal to x.

The basic procedure of the Dijkstra algorithm is illustrated in FIG. 7, wherein the departure state node and the destination state node are marked as "Start" and "Destination", respectively. There may be many candidate routes/paths to go from "Start" to "Destination", which may be composed of a series of sub-paths. For each sub-path, its starting point is connected to all of its neighboring points by assigning certain cost values (e.g. fuel consumption). The optimal sub-path follows the line with the lowest value, while this line typically is not used. When a line reaches a point which has already been tested, it is used to compare the current cost to the sub-destination point with preceding options. If the end point cost for the newly tested route is smaller than the original, the new cost is assigned to that point and the original route dismissed as part of an optimal solution. Following this searching procedure, routes evolve towards the end point, and one optimal route remains. In FIG. 7, the bold lines mark the routes with the smallest values, i.e. an optimal route.

Figure 8:
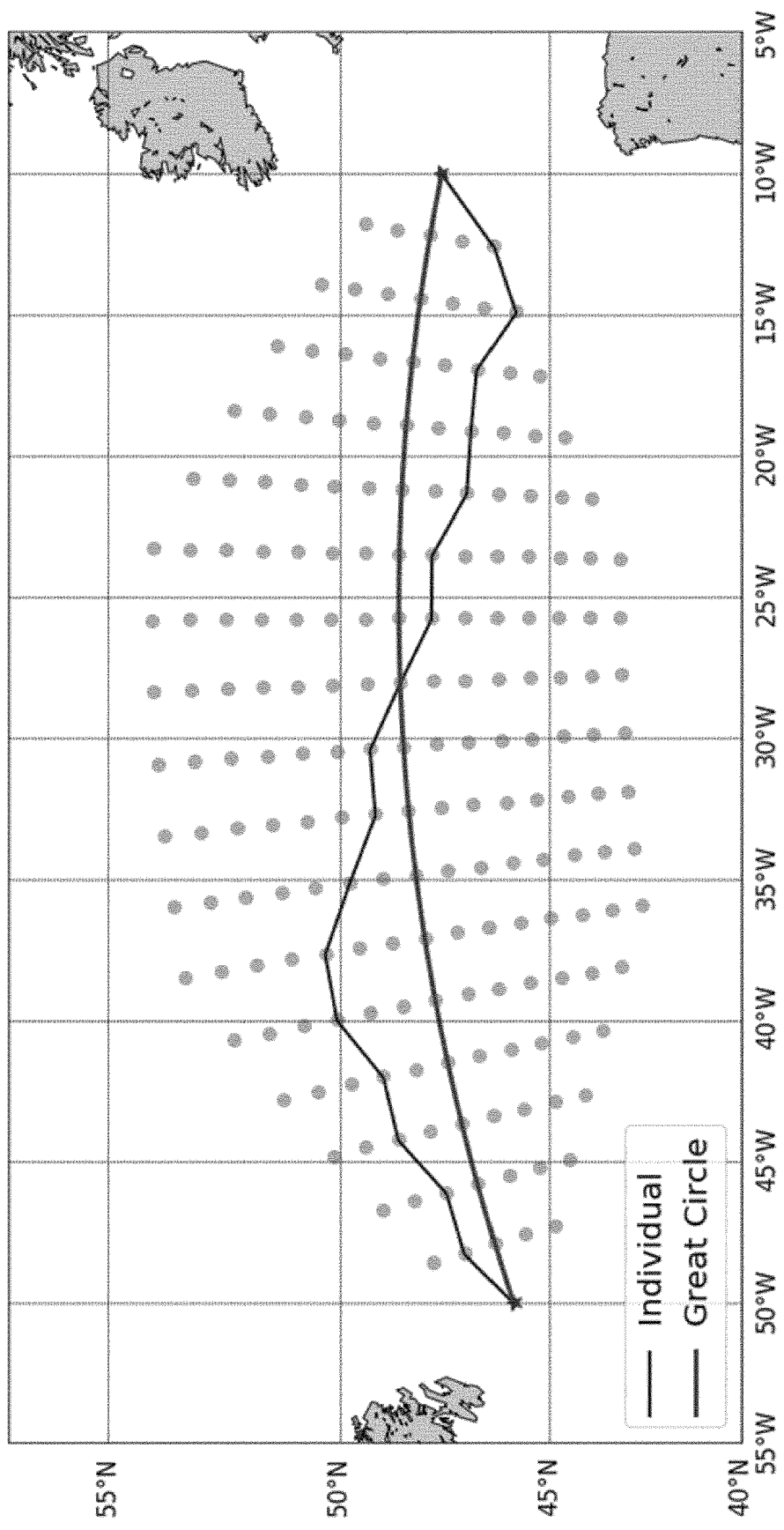
FIG. 8 shows a schematic diagram of an individual of a plurality of individuals in relation to a great circle route.

FIG. 8 shows a schematic diagram of an individual of a plurality of individuals in relation to a great circle route. The routes obtained by the preliminarily generated optimal route algorithm, e.g. the Dijkstra algorithm or any other similar algorithm, may further be improved by the genetic algorithm. Genetic algorithm components which may e.g. be applied are population initialization, selection, and/or crossover.

The output of the preliminarily generated optimal route algorithm, e.g. the Dijkstra algorithm or any other similar algorithm, gives a path and its corresponding arrival time at each node in the path. An individual defined herein e.g. has two set of variables, one for the deviation of the geometrical points in the path, and the other for the deviation of arrival time at each node. The initial population may give a number of individuals as defined above. The fitness function of the genetic algorithm may be the same as the objective function above, which may return a power consumption for a path with location and arrival time. An individual may be added to the shortest path and the fitness value of the new changed path may be calculated by the fitness function. The selection of parents for breeding may e.g. use a stochastic universal sampling method as e.g. introduced in the paper by James Baker, "Reducing bias and inefficiency in the selection algorithm," Proceedings of the Second International Conference on Genetic Algorithms, pp. 14 to 21, 1986. This approach may represent a further development of the fitness proportion selection method. It may create a wheel which may be associated with each individual and that may have a size proportional to the fitness of the individual. Furthermore, the crossover operator may be adopted. Firstly, a point may be chosen randomly in an individual for both sets of variables. The sequence of chromosome from the first parent to the left of the crossover point and the remaining part of chromosome from the second parent may be combined together to be the offspring. Transfusion may also be added which will put new individuals into the population every several steps in order to avoid premature convergence of the population. The genetic algorithm thus relates to metaheuristics inspired by the theory of evolution, using concepts such as natural selection, reproduction, genetic heritage and mutation.

An exemplary refined algorithm for route optimization may e.g. be composed of traditional genetic algorithm components, such as population initialization, selection, mutation and crossover, and a local optimization algorithm, e.g. a Dijkstra algorithm or any other similar algorithm, and transfusion. The local optimization algorithm may e.g. be responsible for giving instructive chromosomes for the population. Transfusion may avoid a premature convergence of the population.

An exemplary pseudocode for the refined algorithm is given as follows:

HGA

```
Input: dep: start coordinate; des: end coordinate; r: resolution;
bath: bathymetry info; met: meteorology info; sm: ship model
Output: bestPop: best population;
Start:
    Nodeset←NodeGenerator(dep, des, r) # 1
    Graph(V,E)←GraphGenerator(Nodeset, bathy)#2
    SpecificIndividuals(SI)←Dijkstra(Graph, met, sm)#3
    POP←initial_population(Graph) + SI
    While cost(POP) not converge:
        Parents←Selection(POP) # 4
        Parents←Mutation(Parent) # 5
        If EvolveTimes%3←0:
            POP←Transfusion( ) + parents # 6
        Else:
            C←Crossover(parents) # 7
            POP←parents
        bestPop←POP
    Return bestPop
```

The first step may be to initialize the geographic state nodes/waypoints between the departure location and the destination location.

A route may be divided into several stages along the great circle path. For each stage, several state nodes/waypoints perpendicular to the great circle sub-route may be generated.

The graph may be generated based on the plurality of state nodes. The graph may be used for creating feasible connections/edges between the state nodes on adjacent stages.

Graph

```
Input: Nodeset; max_dist: maximum distance ship can go from
one waypoint; bath: bathymetry info; dl: water depth limitation
Output: Graph
Start:
For nodes between two adjacent stages:
    If (path between two nodes > bath(dl))
        and (distance between two nodes < max_dist):
        Graph.add_edge(node1, node2)
Return Graph
```

An individual may be defined as a path between the departure location and the destination location. It may comprise state nodes in every stage. A feasible individual may be defined based on a connection/edge defined in the graph.

The selection method uses a fitness proportionate selection, which is to choose a certain proportion of the population with low fitness value. Alternatively, it could be changed to truncation selection, which repeatedly selects the best individual of a randomly chosen subset.

In order to give a valid mutation on an individual, the following approach may be used:

---
Mutation
---
Input: individual; Graph
Output: mutate individual
Start:
   Rind← randomly choose position from an individual
   Inode← in-nodes of individual[Rind]
   Onode← out-nodes of individual[Rind]
   succ← successors of Inode
   pred← predecessor of Onode
   AvailNodes← Unique(succ, pred) - individual[Rind]
   individual[Rind]← randomly choose AvailNodes
   return individual
---

To demonstrate the application of the hybrid route optimization algorithm for route optimization, a ship voyage crossing the North Atlantic Ocean from the European side to New York during a winter season is chosen. In order to compare the benefits of using the hybrid route optimization algorithm for routing optimization, a voyage in January is selected. In this example, the weather information is taken from an ECMWF ERA-interim dataset.

Figure 9:
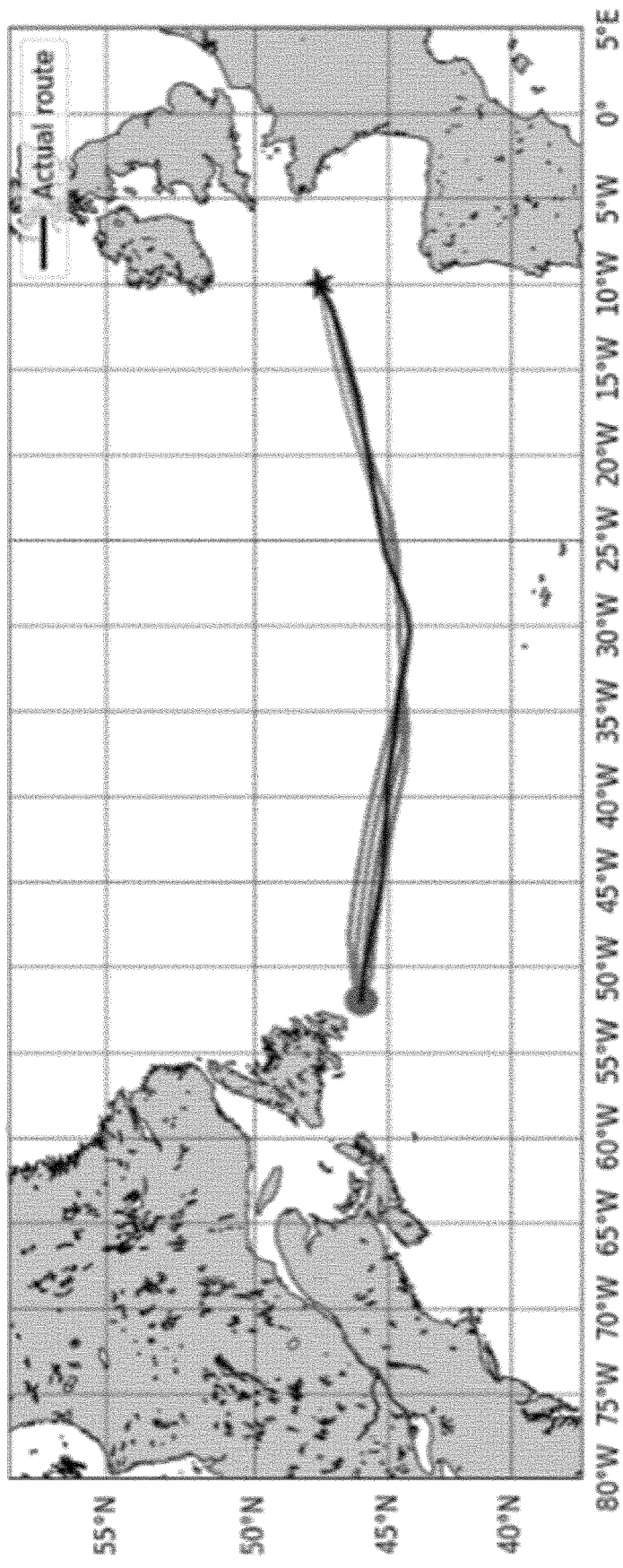
FIG. 9 shows a schematic diagram of different optimal routes for different estimated times of arrival (ETAs)

FIG. 9 shows a schematic diagram of different optimal routes for different estimated times of arrival (ETAs). The ETAs used here are referring to the approximate sailing time that is required in order to give the estimation, rather than providing the specific date or time, which is the standard in the maritime industry for ETAs. The number of state nodes generated in this example is 18381 and the number of arcs/edges assigned is 151424. In total, 65 optimal routes are available for different ETAs, whereas the ETAs range from 96 h to 128 h with a 0.5 h time interval. In this example, the route as shown in FIG. 9 is chosen from a part of a real voyage measured by a container ship. It started at the star mark and ended at the circle mark. The diagram shows all the 65 optimal routes.

Figure 10:
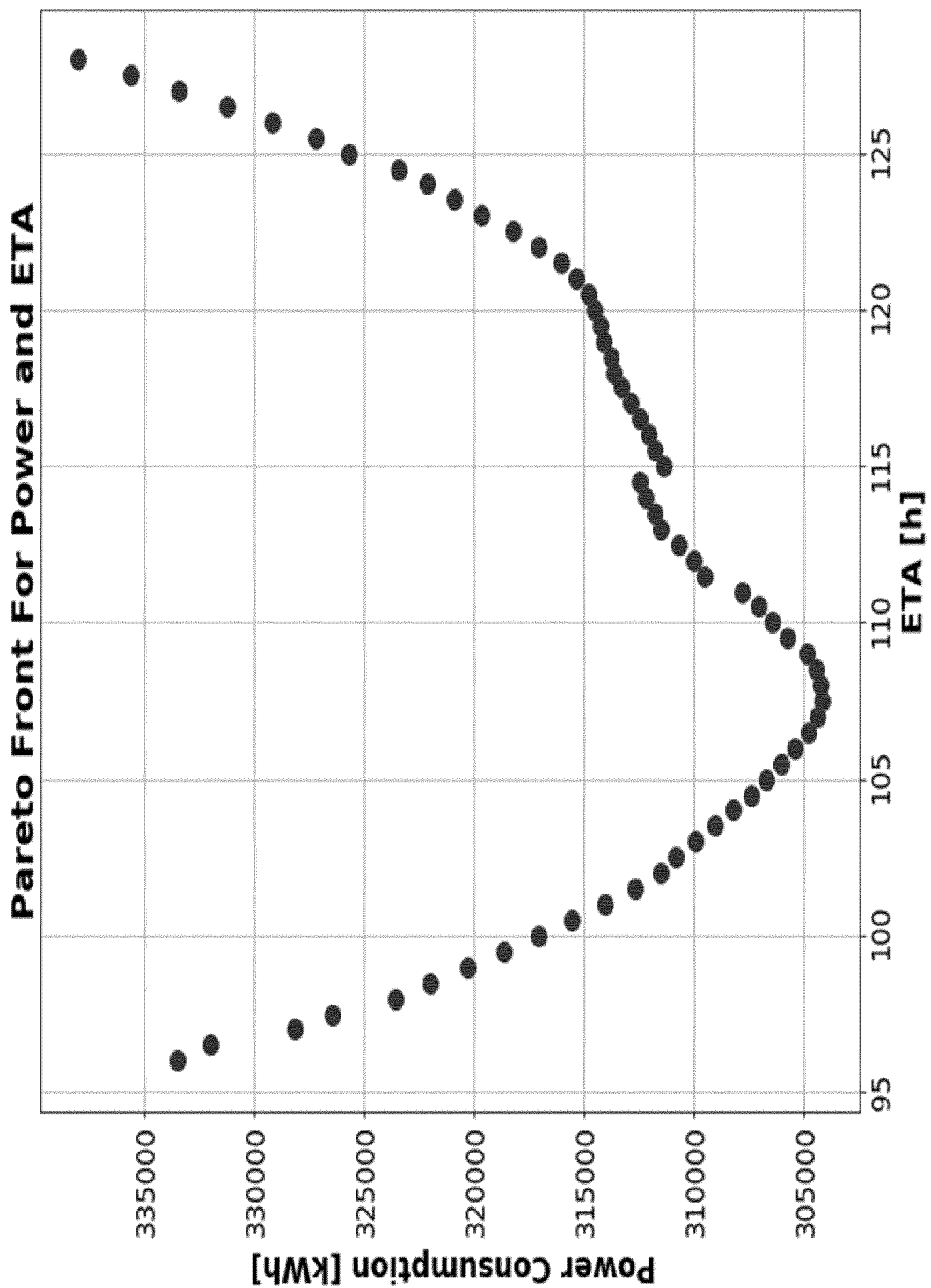
FIG. 10 shows a schematic diagram of a Pareto front for different estimated times of arrival (ETAs) and different power consumptions.

FIG. 10 shows a schematic diagram of a Pareto front for different estimated times of arrival (ETAs) and different power consumptions. The ETAs used here are referring to the approximate sailing time that is required in order to give the estimation, rather than providing the specific date or time, which is the standard in the maritime industry for ETAs. The Pareto front refers to a set of Pareto efficient allocations, which may be depicted graphically. As the exemplary 65 optimal routes are all optimal routes for their respective ETA, the Pareto front can be obtained from them. The diagram indicates that the optimal route for this voyage may e.g. be at an ETA between 105 h and 110 h, while routes with long ETAs correspond to routes which differ significantly from the shortest distance route in order to avoid little storms.

Figure 11:
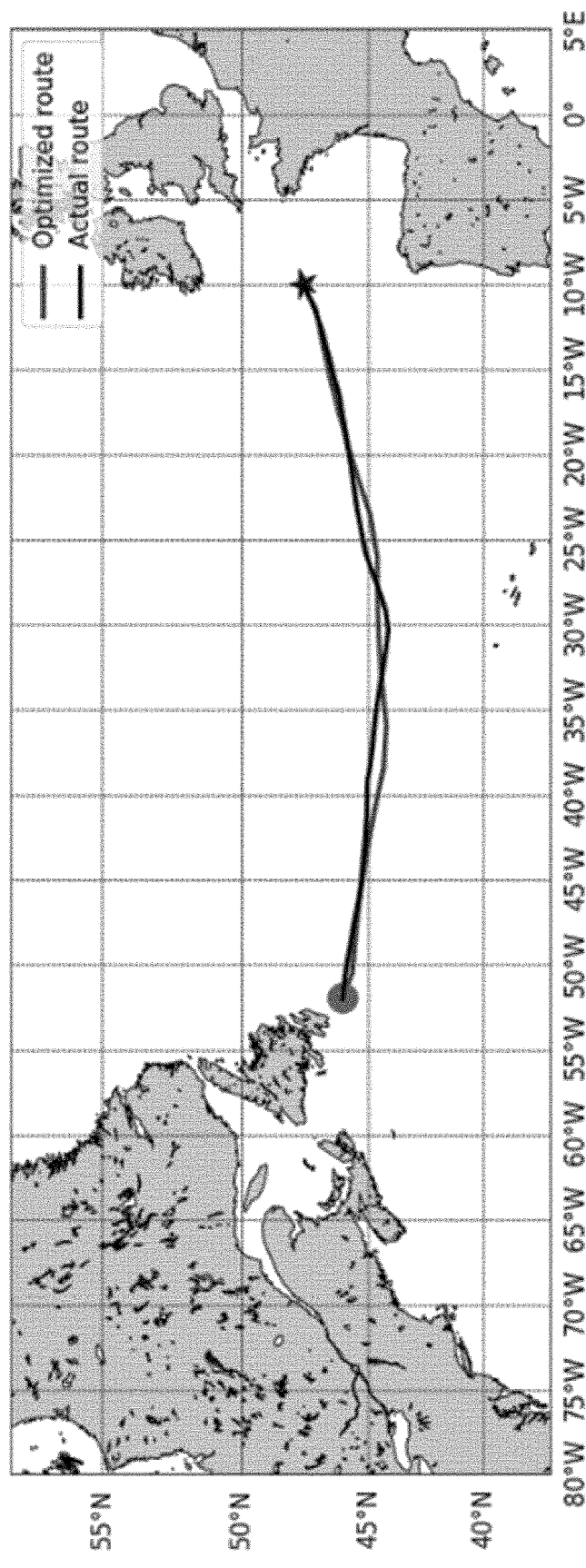
FIG. 11 shows a schematic diagram of an optimal route of a maritime ship in comparison to an actual route of the maritime ship.

FIG. 11 shows a schematic diagram of an optimal route of a maritime ship in comparison to an actual route of the maritime ship. The ETAs used here are referring to the approximate sailing time that is required in order to give the estimation, rather than providing the specific date or time, which is the standard in the maritime industry for ETAs. The ETA of the actual route is 105.8 h. An optimal route with approximately the same ETA as the actual route (having an ETA of 106 h) is selected for comparison. The diagram shows the difference between their respective trajectories.

Figure 12:
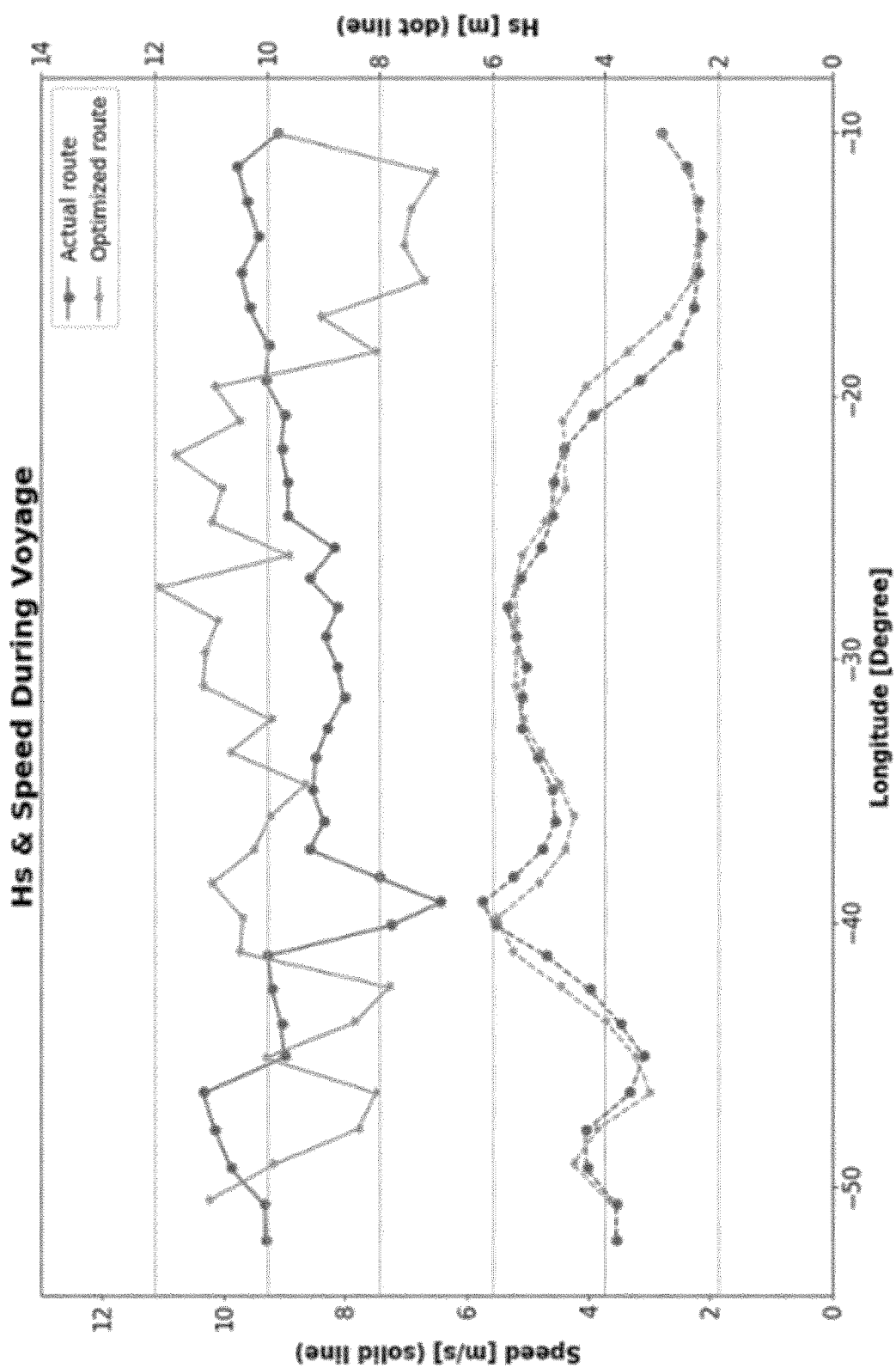
FIG. 12 shows a schematic diagram of a speed of a maritime ship and a wave characteristic for an optimal route and an actual route of a maritime ship.

FIG. 12 shows a schematic diagram of a speed of a maritime ship and a wave characteristic for an optimal route and an actual route of a maritime ship. Exemplarily, the wave characteristic refers to a significant wave height $H_s$. The optimal route successfully avoids the largest significant wave height $H_s$ and allows for an exemplary 6.32% power consumption reduction. The wave characteristic may, however, also refer to a minimum wave height, a maximum wave height, a wave period, a wave propagation direction, and/or a wave spectrum.

Figure 13:
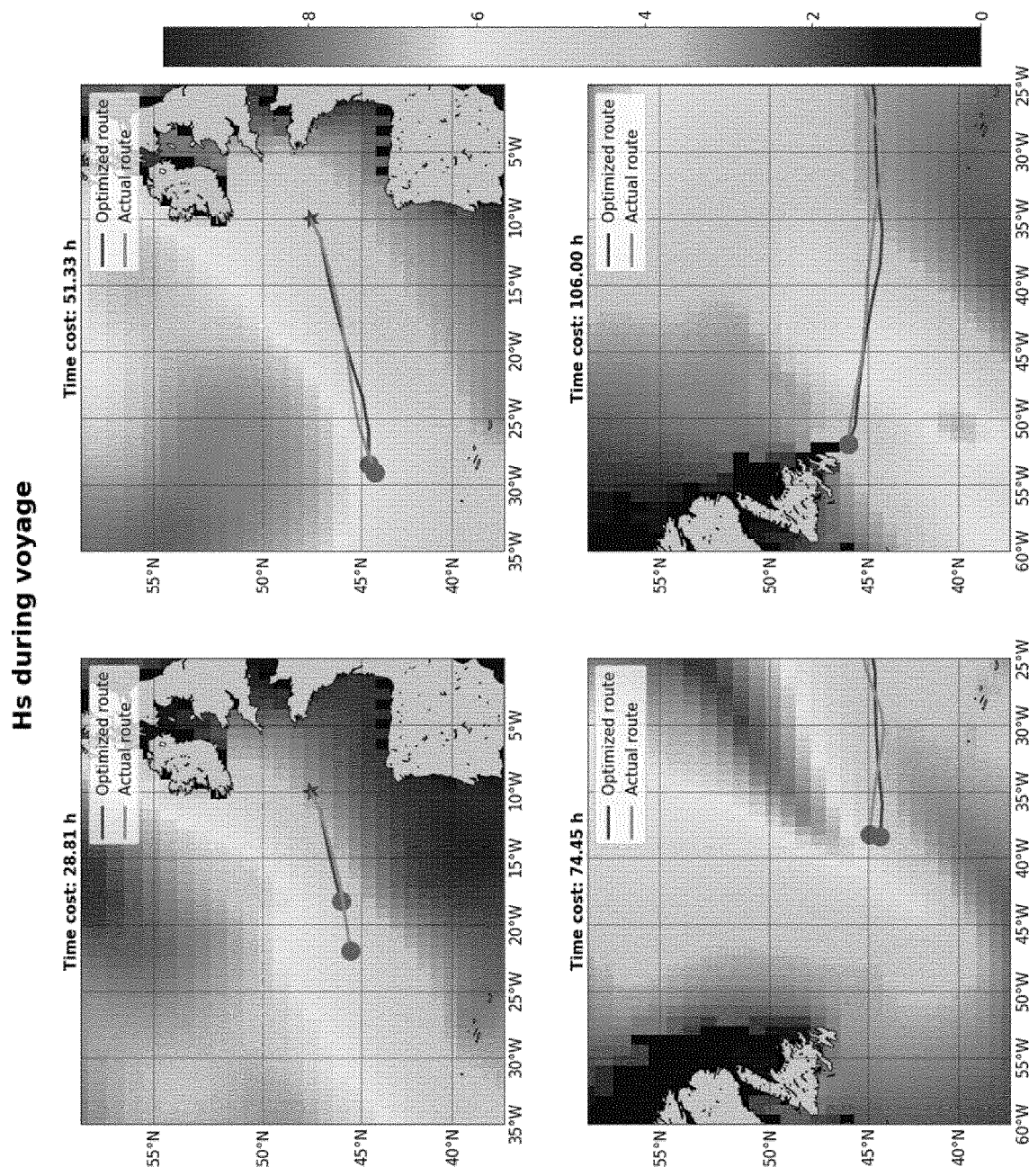
FIG. 13 shows a schematic diagram of wave characteristics at different times.

FIG. 13 shows a schematic diagram of wave characteristics at different times during a voyage. Exemplarily, the wave characteristic refers to a significant wave height $H_s$. The diagram shows that the optimal route may be determined so as to avoid storm by reducing the speed at the beginning of the voyage. The wave characteristics may, however, also refer to minimum wave heights, maximum wave heights, wave periods, wave propagation directions, and/or wave spectra.

In summary, a hybrid routing optimization algorithm (HROA) for solving the route optimization problem is provided. The approach may combine a preliminarily generated optimal route algorithm, such as the Dijkstra algorithm or any other similar algorithm, and a genetic algorithm for a more efficient route optimization, based on a graph along the sailing area. The approach has several advantages with regard to route optimization. For example, the approach may allow to optimize a route with respect to multi-objectives, e.g. an accurate ETA and minimum fuel consumption. A trajectory and respective speeds from the planned routes can be further optimized by the genetic algorithm in order to ease actual ship navigation and to avoid extra power consumption through refining course changes. For computational efficiency, parallel computing can easily be applied within the approach, and recalculation can be done during the voyage without a new setup if there are deviations over the states. The performance of the approach is also demonstrated for an exemplary route planning during a winter season when sailing in the North Atlantic. The example shows that the approach has great potential to lower the power consumption and it can provide a ship's sailing schedule with a more accurate expected time of arrival. This algorithm can also overcome the difficulties of conventional algorithms. In particular, it may be easy to consider additional variables such as time and speed in the optimization process. It is demonstrated by an exemplary case that the hybrid route optimization algorithm can easily avoid high significant wave heights $H_s$ in storm zones. The approach further turns out to be suitable for providing reliable routes at rough sea conditions. The approach may also provide the Pareto front which may help users to make tradeoffs within or along the front.

This work has received funding from the EU FP7 Space-Nav project (grant agreement no. 607371) and the EU Horizon2020 EONav project (grant agreement no. 687537).

REFERENCE NUMERALS

100 Apparatus
101 Database
103 Processor
200 Method
201 Generating
203 Determining
205 Appending
207 Generating
209 Generating
211 Applying
213 Applying

What is claimed is:

1. An apparatus for determining an optimal route of a maritime ship, wherein the maritime ship is to depart at a departure location at a departure time and arrive at a destination location at a destination time based on one or more user needs, including but not limited to: fuel consumption, power consumption, emissions, Estimated Time of Arrival (ETA), care of cargo during a voyage, rough weather avoidance, voyage safety, ship structural stress, and passenger sailing comfort, and wherein the apparatus further comprises:
a database configured to store a service speed of the maritime ship, bathymetry information comprising squat effect information, and a ship performance model representing a performance of the maritime ship, the ship performance model comprising a range of the maritime ship, a turn radius of the maritime ship, a maneuverability of the maritime ship, a maximum speed of the maritime ship, and a shaft power of the maritime ship;
memory storing code comprising processor-executable instructions; and
a processor, wherein, based on executing the processor-executable instructions, the processor is configured to:
generate a plurality of state nodes based on the departure location, the destination location, and the service speed, each state node of the plurality of state nodes indicating a respective location;
determine a plurality of time sets based on the plurality of state nodes, the departure time, and the destination time, the plurality of time sets being associated with the plurality of state nodes, and each time set of the plurality of time sets indicating a range of arrival times associated with a respective state node of the plurality of state nodes;
append the plurality of time sets to the plurality of state nodes to obtain a plurality of appended state nodes;
determine geographic constraint information based on the plurality of state nodes and the bathymetry information;
determine time constraint information based on the plurality of time sets and the ship performance model;
generate a plurality of edges based on the plurality of appended state nodes, the geographic constraint information, and the time constraint information, each edge of the plurality of edges being associated with a pair of appended state nodes of the plurality of appended state nodes and a respective optimization cost;
generate a graph based on the plurality of appended state nodes, the plurality of edges, and the ship performance model;
apply a preliminarily generated route optimization on the graph to obtain a preliminarily defined route path of the maritime ship between the departure location and the destination location;
apply a genetic algorithm based on the preliminarily defined route path to obtain the optimal route of the maritime ship; and
provide, to the maritime ship, the optimal route for traveling between the departure location and the destination location.

2. The apparatus of claim 1, wherein:
the database is further configured to store weather information, and
the processor is further configured to generate the graph further based on the weather information.

3. The apparatus of claim 1, wherein the respective optimization cost comprises a power consumption of the maritime ship, a fuel consumption of the maritime ship, an emission of the maritime ship, a risk of cargo loss of the maritime ship, a fatigue damage in a structure of the maritime ship, or any combination thereof, wherein the emission of the maritime ship comprises a CO2 emission, SOx emission, NOx emission, PM emission, or any combination thereof.

4. The apparatus of claim 1, wherein the graph is a three-dimensional graph and comprises a first dimension with respect to longitude, a second dimension with respect to latitude, and a third dimension with respect to arrival time.

5. The apparatus of claim 1, wherein the preliminarily defined route path is based on a Dijkstra algorithm, a Bellman-Ford algorithm, an A* search algorithm, a Floyd-Warshall algorithm, a Johnson's algorithm, a Viterbi algorithm, or any combination thereof.

6. The apparatus of claim 1, wherein the processor is further configured to:
determine a population of routes comprising a plurality of individuals based on the preliminarily defined route path, and
apply the genetic algorithm on the plurality of individuals.

7. The apparatus of claim 6, wherein each individual of the plurality of individuals is associated with a respective location deviation, a respective arrival time deviation with regard to the preliminarily defined route path, or both, and wherein the respective location deviations, the respective arrival time deviations of the plurality of individuals, or both, are different from one another.

8. The apparatus of claim 6, wherein the processor is further configured to:
perform a selection step, a mutation step, a transfusion step, a crossover step, or any combination thereof, on the plurality of individuals.

9. The apparatus of claim 6, wherein the processor is further configured to:
select an individual from the plurality of individuals, wherein the selected individual is associated with an optimal total optimization cost, and wherein the selected individual forms the optimal route of the maritime ship.

10. The apparatus of claim 6, wherein the processor is further configured to:
modify the graph, the plurality of edges, or both, based on the selected individual.

11. A method for determining an optimal route of a maritime ship, the method comprising:
storing, in a database, a service speed of the maritime ship, bathymetry information comprising squat effect information, and a ship performance model representing a performance of the maritime ship, the ship performance model comprising a range of the maritime ship, a turn radius of the maritime ship, a maneuverability of the maritime ship, a maximum speed of the maritime ship, and a shaft power of the maritime ship;
generating, by a processor configured to execute processor-executable instructions of code stored in memory, a plurality of state nodes based on a departure location of the maritime ship, a destination location of the maritime ship, and the service speed, each state node of the plurality of state nodes indicating a respective location;
determining, by the processor, a plurality of time sets based on the plurality of state nodes, a departure time of the maritime ship, and a destination time of the maritime ship, the plurality of time sets being associated with the plurality of state nodes, and each time set of the plurality of time sets indicating a range of arrival times associated with a respective state node of the plurality of state nodes;

appending, by the processor, the plurality of time sets to the plurality of state nodes to obtain a plurality of appended state nodes;

determining, by the processor, geographic constraint information based on the plurality of state nodes and the bathymetry information;

determining, by the processor, time constraint information based on the plurality of time sets and the ship performance model;

generating, by the processor, a plurality of edges based on the plurality of appended state nodes, the geographic constraint information, and the time constraint information, each edge of the plurality of edges being associated with a pair of appended state nodes of the plurality of appended state nodes and a respective optimization cost;

generating, by the processor, a graph based on the plurality of appended state nodes, the plurality of edges, and the ship performance model;

applying, by the processor, a preliminarily generated route optimization on the graph to obtain a preliminarily defined route path of the maritime ship between the departure location and the destination location;

applying, by the processor, a genetic algorithm based on the preliminarily defined route path to obtain the optimal route of the maritime ship; and providing, to the maritime ship, the optimal route for traveling between the departure location and the destination location.

12. The method of claim 11, further comprising:
storing, by the database, weather information; and
generating, by the processor, the graph based on the weather information.

13. The method of claim 11, further comprising:
determining, by the processor, a population of routes comprising a plurality of individuals based on the preliminarily defined route path; and
applying, by the processor, the genetic algorithm on the plurality of individuals.

14. A non-transitory, computer-readable program product for determining an optimal route of a maritime ship, the non-transitory, computer-readable program product comprising a non-transitory, computer-readable medium storing instructions that, when executed by at least one processor of a device, are configured to cause the device to:

store, in a database, a service speed of the maritime ship, bathymetry information comprising squat effect information, and a ship performance model representing a performance of the maritime ship, the ship performance model comprising a range of the maritime ship, a turn radius of the maritime ship, a maneuverability of the maritime ship, a maximum speed of the maritime ship, and a shaft power of the maritime ship;

generate a plurality of state nodes based on a departure location of the maritime ship, a destination location of the maritime ship, and the service speed, each state node of the plurality of state nodes indicating a respective location;

determine a plurality of time sets based on the plurality of state nodes, a departure time of the maritime ship, and a destination time of the maritime ship, the plurality of time sets being associated with the plurality of state nodes, each time set of the plurality of time sets indicating a range of arrival times associated with a respective state node of the plurality of state nodes;

append the plurality of time sets to the plurality of state nodes to obtain a plurality of appended state nodes;

determine geographic constraint information based on the plurality of state nodes and the bathymetry information;

determine time constraint information based on the plurality of time sets and the ship performance model;

generate a plurality of edges based on the plurality of appended state nodes, the geographic constraint information, and the time constraint information, each edge of the plurality of edges being associated with a pair of appended state nodes of the plurality of appended state nodes and a respective optimization cost;

generate a graph based on the plurality of appended state nodes, the plurality of edges, and the ship performance model;

apply a preliminarily generated route optimization on the graph to obtain a preliminarily defined route path of the maritime ship between the departure location and the destination location;

apply a genetic algorithm based on the preliminarily defined route path to obtain the optimal route of the maritime ship; and provide, to the maritime ship, the optimal route for traveling between the departure location and the destination location.

* * * * *